E. L. COBLE.
SPRING WHEEL.
APPLICATION FILED NOV. 22, 1911.

1,045,516.

Patented Nov. 26, 1912.

2 SHEETS—SHEET 1.

Witnesses

Inventor
E. L. Coble
by Watson E. Coleman
Attorney

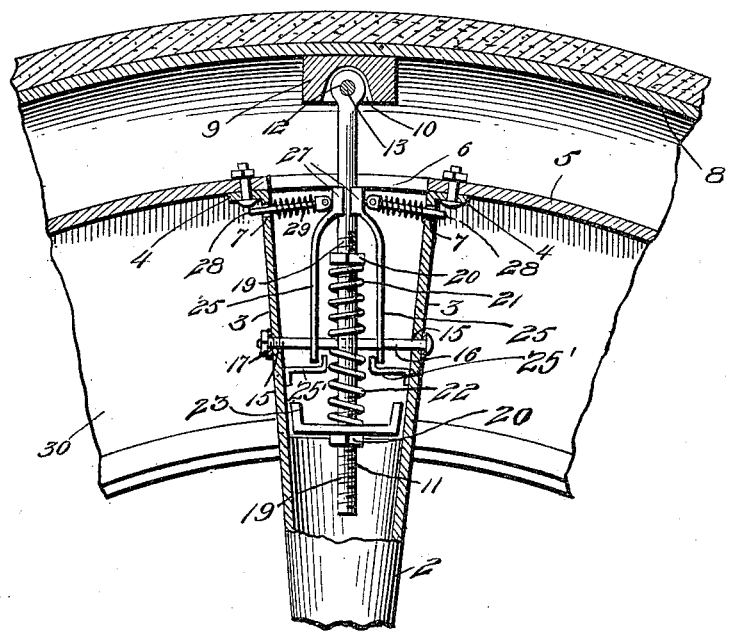
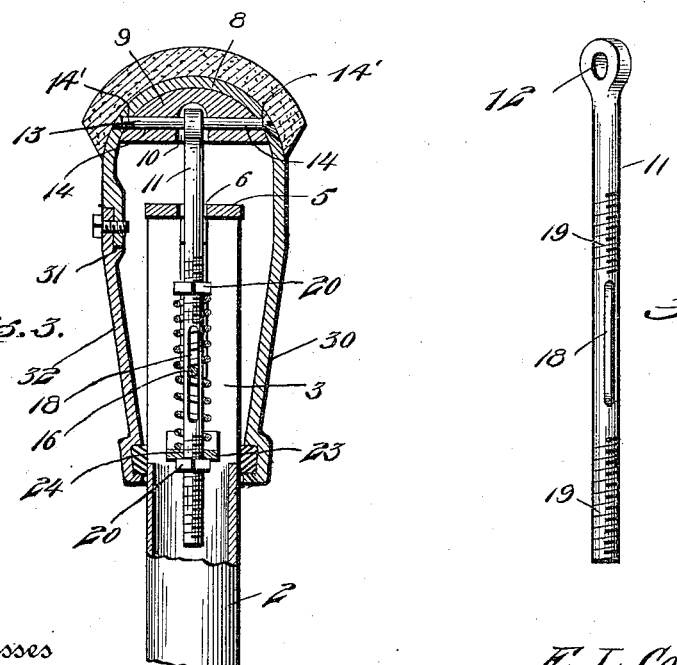

UNITED STATES PATENT OFFICE.

ERNEST L. COBLE, OF ELECTRA, TEXAS.

SPRING-WHEEL.

1,045,516. Specification of Letters Patent. Patented Nov. 26, 1912.

Application filed November 22, 1911. Serial No. 661,702.

*To all whom it may concern:*

Be it known that I, ERNEST L. COBLE, a citizen of the United States, residing at Electra, in the county of Wichita and State of Texas, have invented certain new and useful Improvements in Spring-Wheels, of which the following is a specification, reference being had to the accompanying drawings.

This invention relates to spring wheels, the same being particularly adapted for use upon motor vehicles.

The invention has for its object to produce a wheel of this character which is simple in construction, efficient in operation and one which may be manufactured cheaply.

A further object of the invention is to provide a device of this type having the characteristics of a wheel equipped with the usual pneumatic tire.

Figure 1:
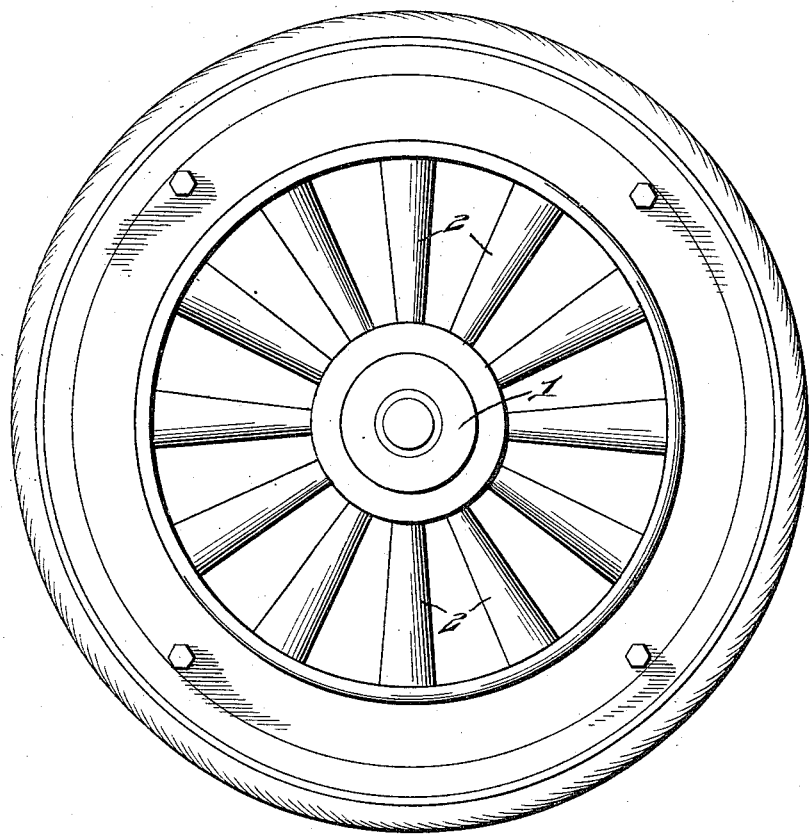
Figure 5:
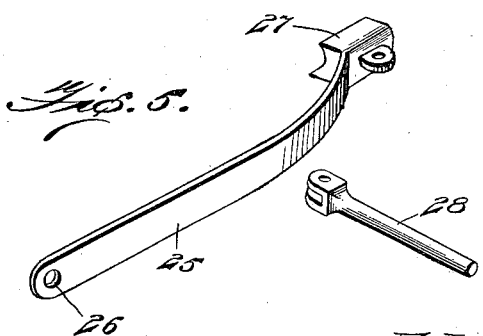

In the accompanying drawings Figure 1 is a side elevation of a wheel; Fig. 2 is a fragmentary sectional view of a portion of a wheel; Fig. 3 is a transverse sectional view; Fig. 4 is a perspective view of one of the rods; Fig. 5 is a similar view of one of the arms and guide pin therefor.

Referring to the drawings, the numeral 1 designates a hub having radiating therefrom, spokes 2. The spokes are formed from tubular metal and conical in longitudinal cross section, and are formed at their outer ends with a pair of diverging arms 3, the extreme ends of which are bent at right angles to form attaching flanges 4. The flanges 4 are riveted or otherwise suitably secured to the inner surface of the inner rim 5. The rim 5 is provided with slots 6, said slots being spaced an equal distance apart, the number of slots corresponding to the number of spokes employed. Apertures 7 are formed within the upper ends of the arms 3, and are arranged in registered relation, the purpose of which will be hereinafter described. An outer rim 8 is provided and has molded to its inner face a series of blocks 9, and said blocks 9 are each provided with recesses 10 in which the upper ends of rods 11 are loosely pivoted, to allow slight pivotal movement. The upper ends of the rods 11 are provided with eyes 12 through each of which is passed a pivot bolt 13, said bolt being passed through openings 14 and 14' formed in the blocks 9 and outer rim 8 respectively. The rods 11 are of sufficient length to extend into the tubular portion of the spokes 2.

Openings 15 are formed in the arms 3, and are arranged in registered relation. Adapted to pass through and be supported by said openings is a bar 16, one end of which is threaded and upon which a clamping nut 17 is threaded. The rod 11 is provided with a longitudinal slot 18, through which the bar 16 passes. The rods 11 are screw threaded for a portion of their length near their outer ends, and have their inner ends screw threaded, as indicated at 19 in the drawing. Adjusting nuts 20 are mounted upon the screw threaded portions of the rods 11, the purpose of which will be hereinafter described.

Surrounding the rod 11, and above the bar 16 is a coil spring 21, the outer terminal of which rests against the inner face of one of the adjusting nuts 20 and the inner terminal of said spring rests upon the bar 16. Surrounding the rod 11 and separated from the coil spring 21 by the bars 16 is a coil spring 22, the inner terminal thereof resting upon a movable guide stay 23, said stay being provided with an aperture 24 through which the lower end of the rod 11 passes. The lower threaded end of the rod 11 extends a sufficient distance beyond the stay 23 to permit the application of the adjusting nut 20. Thus it will be seen that the stay 23 will be engaged with the spoke in the inward movement of the rod 11 and the spring 22 compressed thereby assisting the spring 21 and preventing injury thereto when the wheel is subjected to excessive load pressure. In this manner the spring 22 serves to relieve the spring 21 of undue pressure thereon which would impair its usefulness.

The device further consists of a pair of oppositely disposed arms 25, the lower ends of which are provided with openings 26, whereby the said arms are supported upon the bars 16, and upon opposite sides of the rod 11. The arms are provided at their upper ends with oppositely disposed flanges 27, said flanges being adapted to engage the rod 11 and to hold the arms in their proper relation thereto. To the arms 25, near the upper ends thereof are pivotally connected the inner ends of pins 28, said pins being adapted to slide in the openings 7 formed in the arms 3. Coil springs 29 surround the pins, and exert a constant pressure upon the arms 25 to hold them in yielding contact with the rods 11, due to the fact that said coil springs have their terminals resting against the inner surface of the arms 3 and the flanges 27 of the arms 25, respectively. Guard arms 25' are secured to the inner faces of the spoke arms 3 and extend at their inner ends between the rod 11 and the ends of the arms 25 which are movable upon the bar 16. Thus the liability of said arms contacting with the springs 21 and 22 is effectually prevented.

The outer rim 8 is provided preferably with an integral flange 30, said flange being adapted to extend inwardly a sufficient distance to cover the operative parts of the spokes 2, and may be so shaped as to fit snugly against the spokes to prevent access of foreign matter to the same. The rim 8 is further provided with a series of ears 31, to which is bolted the outer edge of a cover 32, said cover being for the purpose of protecting the mechanism mounted within the spokes 2, from foreign matter, and in a manner similar to that of the flange 30. The inner face of the flange 30 and cover 32 may be provided with a packing of felt or like material to more effectually prevent the access of dust and grit to the interior of the wheel.

From this construction it will be seen that the weight of the vehicle is equally distributed upon the coil springs 21 and 22, during the rotation of the wheel, and that the shock incident to the starting of the vehicle is absorbed by the coil springs 29 which are connected to the arms 25. This construction in no way interferes with the reciprocation of the rod 11, said rod being permitted to slide upon the bar 16 slightly when the vehicle is started. By adjusting the nuts 20 the tension of the springs may be regulated as desired.

Having thus described the invention, I claim:

1. In a wheel, the combination with a hub, of inner and outer rims, spokes radiating from said hub, said spokes being formed from tubular metal and provided at their outer ends with a pair of diverging arms the outer ends of which are secured to the inner rim, slots formed in the same rim, and rods pivotally connected at their outer ends to the outer rim and positioned between the diverging arms, said rods being provided with longitudinal slots, bars supported by said arms and passed through said slots, and coil springs surrounding said rods and having their opposing terminals resting upon said bars.

2. In a spring wheel, the combination of a hub, having spokes radiating therefrom, inner and outer rims, the inner rim being provided with a series of slots spaced an equal distance apart, rods pivotally connected at their outer ends to the outer rim and adapted to pass through the slots in the inner rim, said rods being provided with a longitudinal slot, bars supported by the spokes and passing through the slots formed in the rods, coil springs surrounding said rods and having their opposing terminals resting against said bars, a pair of arms supported by said bars, said arms having their outer ends held in yielding contact with the said rods.

3. In a spring wheel the combination with a hub having spokes radiating therefrom, of inner and outer rims, the inner rim being provided with slots, said spokes being formed with diverging arms, blocks formed upon the inner surface of the outer rim, rods pivotally connected at their outer ends to said blocks and passing through the slots in the inner rim and between the diverging arms of the spokes, longitudinal slots formed in said rods, a bar supported by said arms and passing through said slots, coil springs surrounding said rods and having their opposing terminals resting against opposite sides of said bars, a pair of arms supported by said bars, pins pivotally connected to said arms, openings formed in the upper ends of the diverging arms, of the spokes, said pins being slidably mounted in said openings, coil springs surrounding said pins and adapted to hold said arms in yielding contact with the rods, and means for regulating the tension of the springs which surround said rods.

4. In a spring wheel, the combination with a hub, of inner and outer rims, spokes radiating from the hub, said spokes having diverging arms formed on their outer ends rigidly secured to said inner rim, said rim having slots formed therein between the spoke arms, rods pivotally connected to the outer rim and positioned between said diverging arms, means connecting said diverging arms to guide the rods, coiled springs arranged upon said rods, and plates arranged on said rods and adapted to be engaged by the spokes in their outward movement with relation to the rods to compress one of said springs.

5. In a wheel, the combination with a hub, of inner and outer rims, spokes radiating from said hub and provided at their outer ends with diverging arms rigidly secured to the inner rim, slots formed in said rim between the arms, rods pivotally connected to the outer rim and extending through said slots and positioned between the spoke arms, said rods being provided with longitudinal slots, guide bars connecting the diverging arms and extending through said slots in the rods, springs arranged on each of the rods on opposite sides of the guide bar, a plate on the inner end of the rod, a nut threaded on the rod to normally hold said plate against movement thereon and against the end of one of the springs, said plate being moved on the rod in the outward movement of the spoke to compress one of said springs, arms movable upon said guide bar at their ends, means yieldingly holding the outer ends of said arms in engagement with said rod, and guard means arranged upon the spoke arms and extending between said rod and the inner ends of the spring held arms to prevent contact of said arms with the springs on said rod.

In testimony whereof I hereunto affix my signature in the presence of two witnesses.

E. L. COBLE.

Witnesses:
 T. R. JACKSON,
 W. E. NORTON.